(12) United States Patent
Anantharaman

(10) Patent No.: US 10,346,594 B2
(45) Date of Patent: *Jul. 9, 2019

(54) DIGITAL RIGHTS MANAGEMENT LEVERAGING MOTION OR ENVIRONMENTAL TRAITS

(71) Applicant: Adobe Inc., San Jose, CA (US)

(72) Inventor: Arun Anantharaman, Lost Altos Hills, CA (US)

(73) Assignee: Adobe Inc., San Jose, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/080,062

(22) Filed: Mar. 24, 2016

(65) Prior Publication Data

US 2017/0277868 A1 Sep. 28, 2017

(51) Int. Cl.
*G06F 21/10* (2013.01)
*H04L 29/06* (2006.01)

(52) U.S. Cl.
CPC .............. *G06F 21/10* (2013.01); *H04L 63/10* (2013.01)

(58) Field of Classification Search
CPC ................................ G06F 21/10; H04L 63/10
See application file for complete search history.

(56) References Cited

U.S. PATENT DOCUMENTS

| | | |
|---|---|---|
| 6,317,795 B1 | 11/2001 | Malkin et al. |
| 7,013,149 B2 | 3/2006 | Vetro et al. |
| 8,316,020 B1 | 11/2012 | Kleinmann |
| 8,838,646 B2 | 9/2014 | Kuehr-McLaren et al. |
| 9,613,190 B2 | 4/2017 | Ford et al. |
| 9,928,374 B2 | 3/2018 | Anantharaman |
| 9,953,142 B2 | 4/2018 | Anantharaman |
| 10,248,802 B2 | 4/2019 | Anantharaman |
| 2002/0077985 A1 | 6/2002 | Kobata et al. |
| 2002/0077986 A1 | 6/2002 | Kobata et al. |
| 2003/0052911 A1* | 3/2003 | Cohen-solal ...... H04L 29/06027 715/738 |
| 2004/0044779 A1 | 3/2004 | Lambert |

(Continued)

OTHER PUBLICATIONS

Chun-Te Chen et al., "An Approach of Digital Rights Management for E-Museum with Enforce Context Constraints in RBAC Environments" Oct. 8-11, 2006; 2006 IEEE International Conference on Systems, Man, and Cybernetics; Taipei, Taiwan; Print ISSN: 1062-922X, pp. 1871-1878.*

(Continued)

*Primary Examiner* — Harunur Rashid
(74) *Attorney, Agent, or Firm* — SBMC

(57) ABSTRACT

Digital rights management techniques are used to control access to items of content based on motion or environmental traits. Data is collected that describes motion or environmental traits associated with a request to access content, the request received from a user. A determination is made from the data using a digital rights management module embedded as part of the content as to whether the motion or environmental traits meet specified traits of a motion or environmental behavior of a digital rights management policy enforced by the digital rights management module for at least one item of the content. Responsive to a determination that the specified traits are met, access to the at least one item of the content is permitted by the embedded digital rights management module.

20 Claims, 11 Drawing Sheets

(56) References Cited

U.S. PATENT DOCUMENTS

| | | |
|---|---|---|
| 2005/0044016 A1 | 2/2005 | Irwin et al. |
| 2005/0066357 A1 | 3/2005 | Ryal |
| 2005/0125673 A1* | 6/2005 | Cheng ............... G06F 21/32 713/182 |
| 2005/0273514 A1 | 12/2005 | Milkey et al. |
| 2006/0041502 A1 | 2/2006 | Blair et al. |
| 2006/0149727 A1* | 7/2006 | Viitaharju ............... G06F 21/10 |
| 2007/0156659 A1 | 7/2007 | Lim |
| 2007/0180519 A1 | 8/2007 | Boccon-Gibod et al. |
| 2007/0204078 A1 | 8/2007 | Boccon-Gibod et al. |
| 2008/0005235 A1 | 1/2008 | Hegde et al. |
| 2008/0059474 A1 | 3/2008 | Lim |
| 2008/0060084 A1 | 3/2008 | Gappa et al. |
| 2008/0104118 A1 | 5/2008 | Pulfer et al. |
| 2008/0167921 A1 | 7/2008 | Seo et al. |
| 2008/0182592 A1 | 7/2008 | Cha et al. |
| 2008/0320000 A1 | 12/2008 | Gaddam |
| 2009/0007227 A1 | 1/2009 | Burgess et al. |
| 2009/0048908 A1 | 2/2009 | Kaplan et al. |
| 2009/0228486 A1 | 9/2009 | Kuehr-McLaren et al. |
| 2009/0300712 A1 | 12/2009 | Kaufmann et al. |
| 2010/0005518 A1 | 1/2010 | Tirpak et al. |
| 2010/0185502 A1 | 7/2010 | Roberts et al. |
| 2010/0293049 A1 | 11/2010 | Maher et al. |
| 2010/0293058 A1 | 11/2010 | Maher et al. |
| 2011/0235799 A1 | 9/2011 | Sovio et al. |
| 2011/0258049 A1 | 10/2011 | Ramer et al. |
| 2012/0216300 A1 | 8/2012 | Vivolo et al. |
| 2012/0303827 A1 | 11/2012 | Neystadt et al. |
| 2013/0052990 A1 | 2/2013 | Zhang |
| 2013/0254699 A1 | 9/2013 | Bashir et al. |
| 2013/0315392 A1 | 11/2013 | Steinhauser |
| 2013/0332987 A1 | 12/2013 | Tenneti et al. |
| 2014/0040371 A1 | 2/2014 | Gurevich et al. |
| 2014/0181993 A1* | 6/2014 | Jogand-Coulomb ... G06F 21/10 726/27 |
| 2014/0201351 A1 | 7/2014 | Fransen |
| 2014/0278821 A1 | 9/2014 | McConnell |
| 2014/0298207 A1 | 10/2014 | Ittah et al. |
| 2014/0304836 A1 | 10/2014 | Velamoor et al. |
| 2014/0338001 A1 | 11/2014 | Zhang et al. |
| 2015/0058347 A1 | 2/2015 | Russek |
| 2015/0120648 A1 | 4/2015 | Slovacek |
| 2015/0234796 A1* | 8/2015 | Williams ............ G06F 17/2247 715/229 |
| 2015/0281299 A1 | 10/2015 | Moustafa et al. |
| 2015/0310188 A1 | 10/2015 | Ford et al. |
| 2015/0324698 A1 | 11/2015 | Karaoguz et al. |
| 2016/0021503 A1 | 1/2016 | Tapia |
| 2016/0189198 A1 | 6/2016 | McKenzie et al. |
| 2017/0032109 A1 | 2/2017 | Anantharaman |
| 2017/0041296 A1 | 2/2017 | Ford et al. |
| 2017/0142076 A1 | 5/2017 | Ford et al. |
| 2017/0163839 A1* | 6/2017 | Arana ................... H04N 1/3232 |
| 2017/0177886 A1 | 6/2017 | Anantharaman |
| 2017/0249663 A1 | 8/2017 | Hajiyev et al. |
| 2017/0262619 A1 | 9/2017 | Taneja et al. |
| 2017/0278205 A1 | 9/2017 | Anantharaman |
| 2017/0278206 A1 | 9/2017 | Anantharaman |
| 2017/0286642 A1 | 10/2017 | Anantharaman |
| 2018/0060598 A1 | 3/2018 | Anantharaman |
| 2018/0137121 A1 | 5/2018 | Agarwal |

OTHER PUBLICATIONS

Christian et al, "Context-aware Policy Enforcement for Android", Published in: 2013 IEEE 7th International Conference on Software Security and Reliability, Aug. 1, 2013, pp. 40-49.*

Carreras et al., "A Platform for Context-Aware and Digital Rights Management Enabled Content Adaptation" Published by the IEEE Computer Socity, IEEE MultiMedia ( vol. 17, Issue: 2, Apr.-Jun. 2010) pp. 74-89.*

"Pre-Interview Communication", U.S. Appl. No. 14/975,442, dated Aug. 4, 2017, 3 pages.

Surminen,"Location-based DRM using WiFi Access Points", 2007 International Symposium on Communications and Information Technologies (ISCIT 2007), 2007, 5 pages.

"Pre-Interview Communication", U.S. Appl. No. 14/812,825, dated Oct. 21, 2016, 3 pages.

"First Action Interview Office Action", U.S. Appl. No. 14/812,825, dated Mar. 24, 2017, 3 pages.

"Corrected Notice of Allowance", U.S. Appl. No. 14/975,442, dated Nov. 29, 2017, 4 pages.

"Final Office Action", U.S. Appl. No. 14/812,825, dated Sep. 7, 2017, 9 pages.

"First Action Interview Pre-Interview Communication", U.S. Appl. No. 15/063,996, dated Oct. 16, 2017, 3 pages.

"Non-Final Office Action", U.S. Appl. No. 15/090,211, dated Nov. 17, 2017, 18 pages.

"Notice of Allowance", U.S. Appl. No. 14/812,825, dated Dec. 18, 2017, 7 pages.

"Notice of Allowance", U.S. Appl. No. 14/975,442, dated Nov. 2, 2017, 8 pages.

"Final Office Action", U.S. Appl. No. 15/063,996, dated Mar. 26, 2018, 13 pages.

"Final Office Action", U.S. Appl. No. 15/090,211, dated May 3, 2018, 17 pages.

"Corrected Notice of Allowance", U.S. Appl. No. 14/975,442, dated Feb. 27, 2018, 5 pages.

Chen,"An Approach of Digital Rights Management for E-Museum with Enforce Context Constraints in RBAC Environments", IEEE International Conference on Systems, Man, and Cybernetics; Tapei, Taiwan; Print ISSN: 1062-922X, Oct. 2006, pp. 1871-1878.

"Final Office Action", U.S. Appl. No. 15/803,452, dated Sep. 7, 2018, 11 pages.

"First Action Interview Office Action", U.S. Appl. No. 15/803,452, dated Jul. 11, 2018, 3 pages.

"Non-Final Office Action", U.S. Appl. No. 15/063,996, dated Jul. 10, 2018, 13 pages.

"Non-Final Office Action", U.S. Appl. No. 15/090,211, dated Jul. 12, 2018, 16 pages.

"Pre-Interview First Office Action", U.S. Appl. No. 15/079,788, dated Aug. 8, 2018, 26 pages.

"Pre-Interview First Office Action", U.S. Appl. No. 15/080,181, dated Jul. 27, 208, 3 pages.

"Pre-Interview First Office Action", U.S. Appl. No. 15/803,452, dated Jun. 8, 2018, 4 pages.

Carreras,"A Platform for Context-Aware and Digital Rights Management Enabled Content Adaptation", Apr. 2010, 16 pages.

Jung,"Context-aware Policy Enforcement for Android", IEEE 7th International Conference on Software Security and Reliability, Aug. 1, 2013, pp. 40-49.

Muhlbauer,"Location Constraints in Digital Rights Management", Jun. 8, 2018, 8 pages.

"Advisory Action", U.S. Appl. No. 15/803,452, dated Nov. 23, 2018, 3 pages.

"Final Office Action", U.S. Appl. No. 15/063,996, dated Jan. 23, 2019, 19 pages.

"Final Office Action", U.S. Appl. No. 15/079,788, dated Jan. 31, 2019, 10 pages.

"Final Office Action", U.S. Appl. No. 15/090,211, dated Nov. 9, 2018, 15 pages.

"Notice of Allowance", U.S. Appl. No. 15/803,452, dated Dec. 11, 2018, 8 pages.

"Non-Final Office Action", U.S. Appl. No. 15/080,181, dated Mar. 28, 2019, 14 pages.

"Supplemental Notice of Allowability", U.S. Appl. No. 15/803,452, dated Feb. 27, 2019, 2 pages.

* cited by examiner

DIGITAL RIGHTS MANAGEMENT LEVERAGING MOTION OR ENVIRONMENTAL TRAITS

BACKGROUND

Digital rights management is used to control use of content, e.g., to alter, consume, or distribute content. Current digital rights management techniques are based on qualities that are unique to a particular user. For example, a purchaser of an application from a conventional application store, a song from an online music store, and so on may be given access to the content via a user name and password of an account associated with the user for a corresponding service. Other conventional examples include persistent online authentication, unique content identifiers (e.g., CD keys), digital watermarks, and encryption keys associated with a particular user or user's device.

Each of these conventional techniques, however, is rigid and lacks an ability to address changes in how the content is to be consumed and thus limit usability of the content. Accordingly, this "all-or-nothing" approach to content access may be frustrating to consumers of the content and thus limit desired distribution of the content, and even force the creation of multiple versions of the content and consequently complicate distribution of this content to intended recipients.

SUMMARY

Digital rights management techniques are described that are used to control access to items of content based on motion or environmental traits. Data is collected that describes motion or environmental traits associated with a request to access content. The request is received from a user and describes motion of a user, motion of a computing device associated with the user, environmental traits describing a user's surroundings, or environmental traits describing biometrics of the user.

A determination is made from the data using a digital rights management module embedded as part of the content as to whether the motion or environmental traits meet specified traits of a motion or environmental behavior of a digital rights management policy enforced by the digital rights management module for at least one item of the content. The determination, for instance, may be used to determine how a user is likely to consume the content, where the user is likely to consume the content, emotions associated with the user, and so forth.

Responsive to a determination that the specified traits are met, access to the at least one item of the content is permitted by the embedded digital rights management module. This access, for instance, may be performed based on a determination is whether a user has completed a particular activity, is engaged in a particular activity, does or does not have a specified emotional state, whether or not the user is moving, and so forth. In this way, the digital rights management module may dynamically react to a user and the user's surroundings to control content access.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
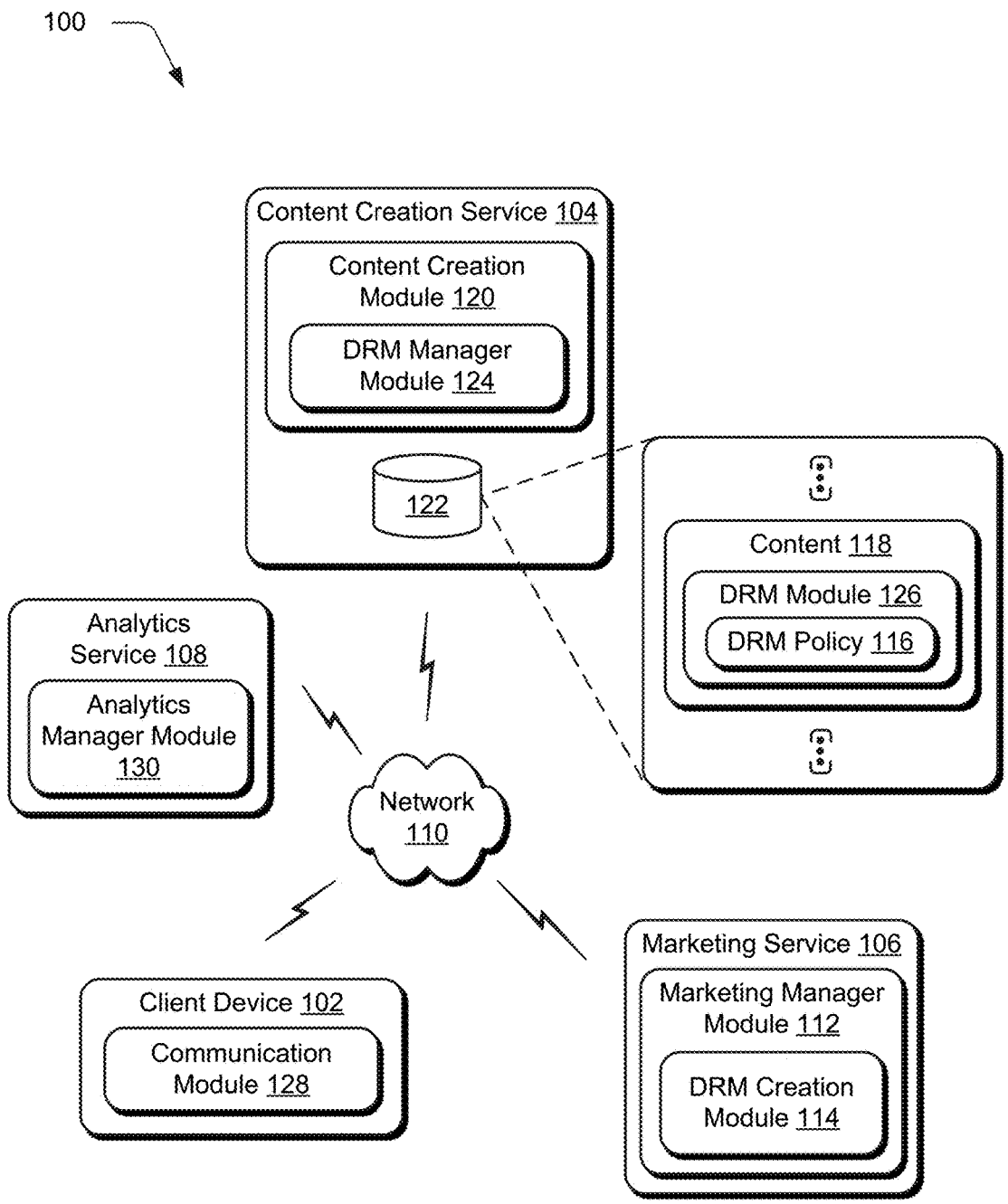
FIG. 1 is an illustration of an environment in an example implementation that is operable to employ digital rights management (DRM) and behavioral trait techniques described herein.

Conventional digital rights management techniques are rigid and inflexible and thus not able to take into account potentially changing traits of a behavior of a user that is to consume content. For example, conventional techniques typically rely on credentials that are particular to a user such that the credentials uniquely identify that user from each other user. Verification of these credentials is then used to grant access to the content in its entirety in these conventional techniques. This is because conventional credentials do not describe content consumption characteristics of the user.

A user name and password, for instance, may be used to control access to content obtained from an online music store, application store, and so on. Accordingly, the user name and password do not describe behaviors of a population, such as a way in which the population acts or conducts itself toward content. As such, although these conventional techniques may relate to the particular user, these techniques do not address traits of a population behavior that may include the user and thus are not capable of addressing changing traits of the behaviors of the users nor can these conventional techniques adapt to other users.

Digital rights management techniques are described that address traits of a behavior of a user population that is to consume the content. In one or more implementations, traits of a behavior are specified that are incorporated as part of a digital rights management policy for content. Analytics data, for instance, may be collected that describes a user population as a whole. A creator of a DRM policy may then select traits of behaviors for a target population as a subset of this user population to control content consumption by the subset of the user population. As described above, behaviors describe a way in which a user population acts or conducts itself toward content that is relevant to the population as a whole but is not particular to any specific user of that population.

In this way, access to all or portions (i.e., items) of the content may be controlled by a digital rights management module based on contemplated behaviors of consumers of the content, which is embedded as part of the content. For example, a marketer may wish to include an image as part of a marketing campaign for a population segment. The marketer may then specify traits of behaviors of the specific target population (e.g., content consumption characteristics related to age, gender, geographic location included as part of analytics data) to be implemented as part of a digital rights management policy as well as characteristics of content that is to be created.

The characteristics of the content as specified by the marketer are then used by a creative professional to create the content, which is then embedded with a digital rights management module that is configured to implement the digital rights management policy. Thus, in this example a workflow may be supported in which a target population and corresponding policy is first specified through interaction with analytics data and then used as a basis to create content for deployment.

Once deployed, the digital rights management (DRM) module may implement the digital rights management policy to dynamically address traits and changes to the traits of a behavior of users that consume the content. The DRM module, for instance, is configured to control access to different portions of the content based on which traits are met by a user requesting this access. Further, the access may be conditional, such as to permit access to one portion of content if a trait is met (e.g., traveling at a speed below a threshold) but a different portion of content if the trait is not met, e.g., traveling at a speed above the threshold. In this way, the marketers may specify how content is to be consumed, address potentially changing tastes and desires of users, as well as how the content is to be consumed dynamically as the user's traits change without changing the content itself. Accordingly, a single item of content may dynamically change to address changing behaviors of users that are to consume the content which was not possible in conventional techniques, which thus required updates and changes to the content which would then be populated back to the users.

For example, motion traits associated with a user that requests access may be used to control access to portions of the content. Motion traits, for instance, may describe an amount of motion (e.g., speed) detected for a user that requests access. A user that is walking, for instance, may be given access to headlines and section headers of an article and when stopped may be given access to a body of the article. In another example, motion traits may be used to distinguish between types of movement and as such may be used as a basis to control access to particular portions of content, e.g., to distinguish between biking and running. Thus, a variety of different motion traits may be used as behaviors to control content access, further discussion of which is described in relation to FIGS. 3-5.

In another example, environmental traits are used to control access to portion of the content. Environmental traits include biometric traits associated with a user that requests access to the content, such as heart rate, galvanic skin response, skin temperature, and other traits detected by sensors from a user's body. These traits may also be used to control content access directly (e.g., based on a user's temperature) or indirectly as inferring other environmental traits of the user, e.g., emotions. For example, a combination of breathing, galvanic response, and temperature may be used to determine whether a user is agitated, e.g., as possibly lying, nervous, hurried, and so forth. From this, access to portions of content may be controlled accordingly, such as to permit access to generalized portions when agitated but restrict access to detailed portions of content once a user has "calmed down."

Environmental traits may also be associated with an environment surrounding a user that requests access to the content. Like above, sensors are used to detect these environmental traits, such as accelerometers, gyroscopes, ambient light sensors, UV sensors, barometers, thermometers, and so forth. These environmental traits are then used to control access to content based on a likely "how" and "where" a user is likely to consume the content. For instance, it may be readily determined as to whether a user is likely indoors or outside and thus access to corresponding portions of the content may be controlled based on this determination, e.g., interior controls for an automobile in a user manual when in a car and exterior options for the automobile when outside the car.

Further, these environmental traits may be combined with the biometric traits above and even the motion traits to make a determination as to a likely activity, in which, a user is participating and/or has participated. Environmental traits, for instance, may be used to determine whether a user has completed an activity and thus may be given access to a portion of content regarding a next activity, may be used to determine a current activity and control data access related to that current activity, and so forth. In this way, dynamic content access is provided that adjusts to how a user access the content as well as what a user is doing in relation to this content access, further discussion of which may be found in relation to FIGS. 6-9.

In the description herein, content refers to a variety of different types of content, such as images, video, sound, and so on. Accordingly, characteristics of content to be created may describe a variety of visual and/or audio characteristics, such as objects to be included in an image, general look and feel of the image, types of sounds to be included in sound, locations for capture of video, and so forth. Digital rights management refers to access control techniques that are usable to control access to the content as a whole or particular portions of the content through use of a digital rights management policy, which in the following may be based on traits of a behavior. Traits of behaviors describe a way in which a user population acts or conducts itself toward content that is relevant to the population as a whole but is not particular to any specific user of that population, such as age group, gender, geographic location, profile, business status, group membership, device characteristics, motion or environmental traits, and so forth. Thus, traits met by a particular user are leveraged by the digital rights management policy to control access to content as a whole or particular portions of the content as further described below.

An example environment is first described that may employ the DRM techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital rights management and behavioral trait techniques described herein. The illustrated environment 100 includes a client device 102, a content creation service 104, a marketing service 106, and an analytics service 108 that are communicatively coupled, one to another, via a network 110. Each of these entities may be configured in a variety of ways using one or more computing devices.

A computing device, for instance, may be configured as a desktop computer, a laptop computer, a mobile device (e.g., assuming a handheld configuration such as a tablet or mobile phone as illustrated), and so forth to implement the client device 102. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" to implement the content creation service 104, the marketing service 106, and the analytics service 108 as further described in relation to FIG. 11.

The marketing service 106 is illustrated as including a marketing manager module 112. The marketing manager module 112 is representative of functionality to support user interaction to create a marketing campaign, track deployment of the marketing campaign, and so forth. A user, for instance, may interact with the marketing manager module 112 to specify a marketing campaign, items of content to be included in the campaign, and one or more behaviors of the campaign. The user may also interact with a DRM creation module 114 that is representative of functionality to specify traits of behaviors to form a DRM policy 116 to be utilized to manage access to content 118. The campaign, for instance, may be configured to control output of different images as a background based on age of users that access the content.

The marketing manager module 112 may employ analytics to generate analytics data (i.e., "big data") that describes a user population, such as traits of behaviors as described above. Through interaction with the marketing manager module 112, a user may then select traits of behaviors of a target population from this data that are to be met by users to consume corresponding portions of content 118. For example, the marketing manager module 112 may output a user interface via which a user may select traits of behaviors for a desired target population (e.g., age, gender, job title), such as by selecting a check box, keyword input, and so forth. In this way, the user is provided with detailed knowledge of traits of behaviors of a target population and from this knowledge select traits of behaviors to be met to consume particular portions of the content 118, rather than guessing which traits could be met by a target population as performed in conventional techniques which may be prone to error and inefficient.

Data describing the content 118 to be created and the traits specified above as part of creation of the DRM policy 116 through interaction with the DRM creation module 114 is then provided to a content creation service 104 in this example. The content creation service 104 includes a content creation module 120 that is representative of functionality to create content 118, which is illustrated as stored in storage 122. A variety of content 118 may be created, such as webpages, advertisements, media including video and/or audio content, and so forth.

Continuing with the previous example, a user interacts with the content creation module 120 to create content 118 having characteristics as specified by the marketing service 106. As part of this creation, a DRM manager module 124 is used to embed a DRM module 126 as part of the content 118. The DRM manager module 124 is representative of functionality to control implementation of the DRM policy 116 as part of the content 118 during consumption of the content 118, e.g., by a communication module 128 (e.g., browser, web-enabled application) of the client device 102.

The DRM module 126 may be configured to determine traits of a user that requests access to the content 118 and provide access to portions of the content 118, if any, that correspond to those traits. For example, the DRM policy 116 may specify different backgrounds of an advertisement for different behaviors. Accordingly, the DRM module 126 determines traits of a user requesting access and provides access to corresponding portions of the content 118, e.g., the backgrounds. In this way, the DRM policy 116 as specified by the marketing service 106 in this example serves as a basis for creation of the content 118 and management of access to portions of the content 118. Examples that support additional complications and dynamic responses of DRM control are described in the following.

The DRM module 126 is configured to leverage data obtained from a variety of sources to determine traits associated with a user in order to control access. An example of one such source is illustrated as an analytics service 108 having an analytics manager module 130 that is representative of functionality to collect analytics data. This may include analytics data such as social network posts, webpages visited, items bought and so forth that is exposed via application programming interfaces by websites. This may also include tracking code that is embedded as part of content that exposes data describing usage of the content. Thus, the "big data" collected by the analytics service 108 from third-party sources may describe the user and content usage of the user which may then be used by the DRM module 126 to control interaction with the content 118 as further described below.

Figure 2:
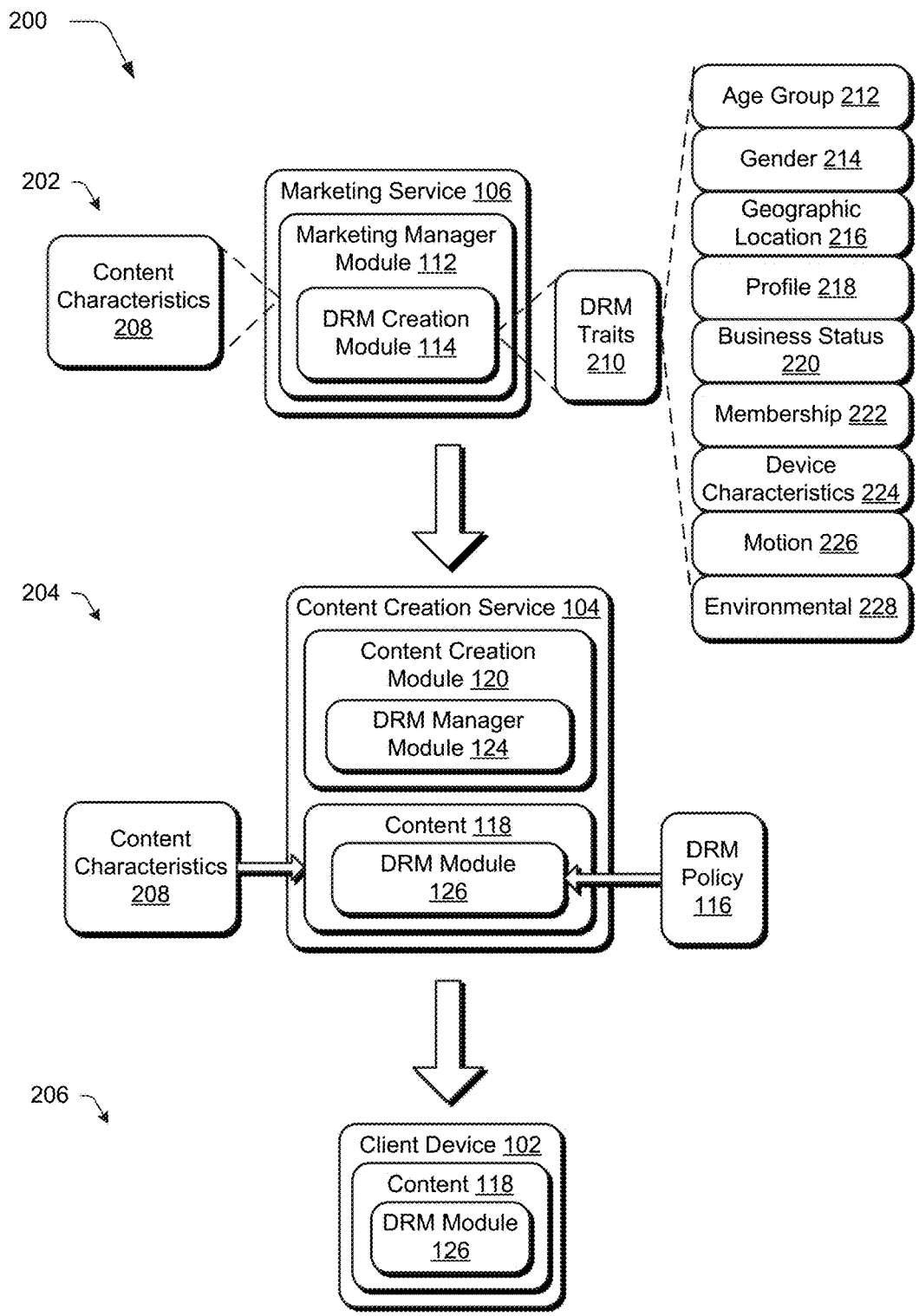
FIG. 2 depicts a system in an example implementation of creation of a DRM policy and subsequent content to be consumed by users included in a behavior.

FIG. 2 depicts a system 200 in an example implementation of creation of a DRM policy and subsequent content to be consumed by users included in a target segment. The system 200 is illustrated using first, second, and third stages 202, 204, 206. At the first stage 202, user interaction with a marketing manager module 110 is used to specify content characteristics 208, e.g., for part of a marketing campaign.

A variety of different content characteristics 208 may be specified, including type of content such as webpage, printed add, audio such as a jingle or song, video such as an instructional product video or dedicated product advertisement, legal contract. The content is also deliverable in a variety of ways, e.g., streaming or downloaded for local storage and subsequent playback.

The marketing manager module 112 as previously described also includes a DRM creation module 114. The DRM creation module 114 in this instance is representative of functionality to specify digital rights management (DRM) traits 210 of behaviors that are used to create a DRM policy 116 of the content creation service 104. The DRM policy 116 as previously described is configured to control content access by determining which traits of users are satisfied in order to gain access to portions of content. As described above, the DRM traits may be specified in a variety of ways, such as through selection of particular traits collected through analytics by the marketing service 106.

A variety of different DRM traits 210 may be specified, such as traits particular to a behavior but are not unique to individual members having the behavior, e.g., may be satisfied by a plurality of users. Examples of such behavioral traits that are usable to determine potential interaction of a user with content include age group 212 (e.g., particular age or age range), gender 214, geographic location 216 (e.g., based on IP address, city, state, region, country, continent), organizational associations such as profile 218 (e.g., traits included in a social network profile, business title in a business website, educational degrees achieved, particular skills), business status 220 (e.g., whether an associated business is in good standing, business certifications), group membership 222 (e.g., membership to a particular organization), and other traits such as device characteristics 224 of a device being used by the user to gain access (e.g., brand, hardware resources, software resources, display resources), and temporal traits (e.g., business hours, time of day, day of week, week of month, year). Additional examples of traits include motion 226 (e.g., motion exhibited by a user or a device making a request), environmental 228 (e.g., a user's surrounding or biometric to describe the user), and so forth as further described in the following.

At the second stage 204, a content creation module 120 of the content creation service 104 is used to create content 118 and a DRM module 126 to control access to the content 118 as specified by a DRM policy 116 created based on the specified DRM traits 210. A creative professional, for instance, may interact with the content creation module 120 of the content creation service 104 to create content 118 as specified by the content characteristics 208 received from the marketing service 106. The marketing service 106, for instance, may specify different images and the content characteristics 208 thereof to be used as alternatives as part of a marketing campaign based on the DRM traits 210. The creative professional may then create content 118 as specified.

The content creation module 120 also includes a DRM manger module 124 that is representative of functionality that is configured to implement the DRM policy 116 through embedding the DRM module 126 as part of the content 118. The DRM module 126, for instance, may be executable to determine DRM traits associated with consumption of the content 118. As described above, these may include DRM traits 210 of a behavior that are not specific to a particular user, including traits of a device used, age group, geographic location, and so forth.

Accordingly, the content 118 having the DRM module 126 may be provided to a client device 102 for consumption as shown at the third stage 206. The DRM module 126 may then be utilized to address differences in traits between users, such as gender 212. The DRM module 126 is also usable to address changes in the user, itself, such as change in age group 212, geographic location 216, business status 220 (e.g., job title), membership 222, motion 226, an environment 228 in which the user is location, and so on. Further, as the DRM module 126 is embedded as part of the content 118 this dynamic consumption may be performed offline without accessing a network, and thus may address limitations of conventional techniques that required access in order to serve different content, such as targeted advertisements as part of webpages that are obtained and not available locally until relevant characteristics of a user are determined.

Figure 3:
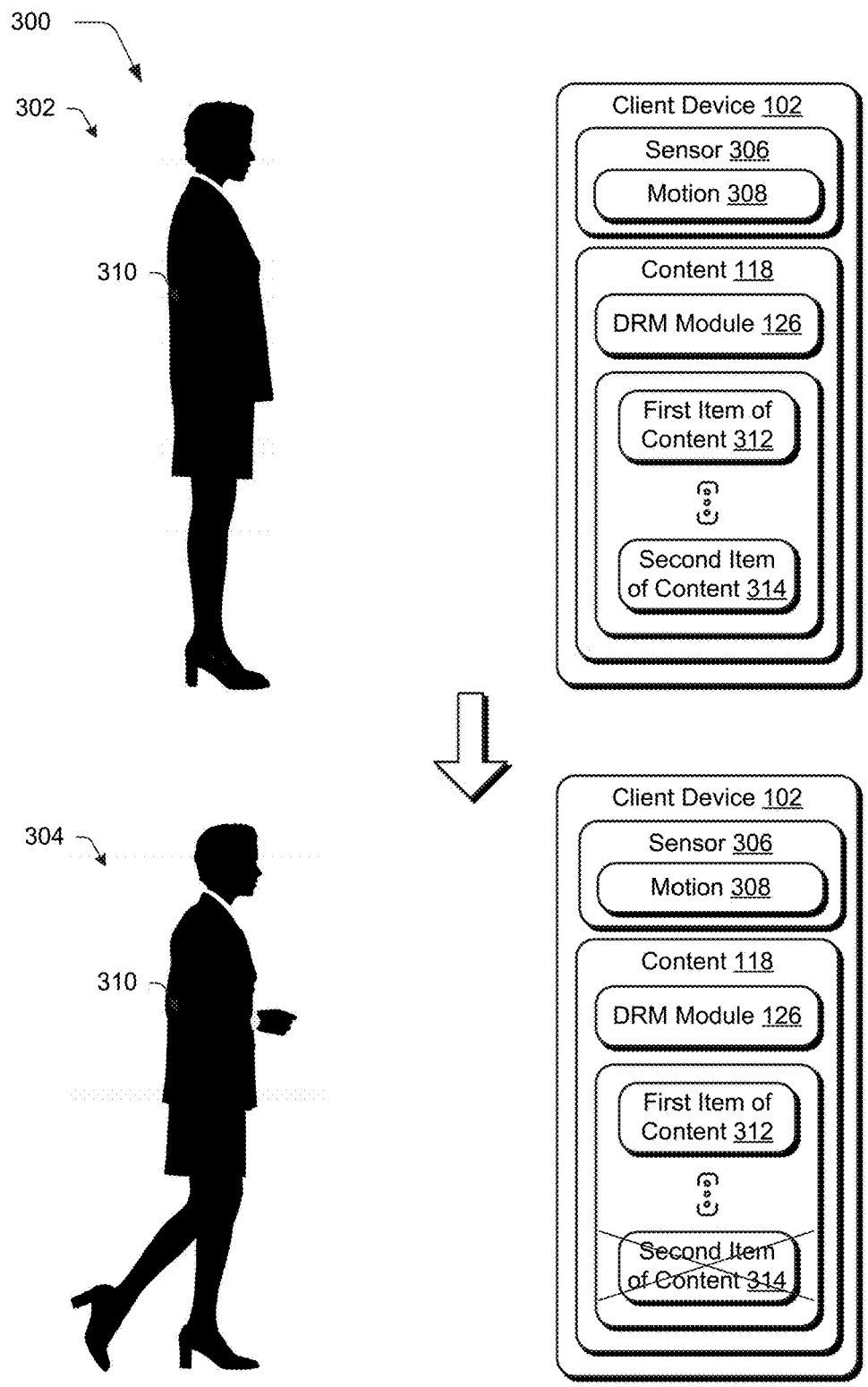
FIG. 3 depicts a system in an example implementation in which digital rights management is utilized to control access to items of content based on motion.

FIG. 3 depicts a system 300 in an example implementation in which digital rights management is utilized to control access to items of content based on motion. This example is illustrated using first and second stages 302, 304. The client device 102 includes a sensor 306 that is configured to detect motion 308. This motion 308 may include motion of the client device 102 itself (e.g., is included as part of the client device 102) or motion of a user 310 of the client device 102, e.g., detected using a wearable computing device. A variety of different types of sensors may be used, such as an accelerometer, positioning system, inertia detection device, or magnetometer.

The motion 308 detected by the sensor 306 is leveraged by the DRM module 126 to control access to first and second items of content 312, 314. In the illustrated example at the first stage 302, the DRM module 126 determines from data received from the sensor 306 that the user 310 is not moving above a threshold amount, e.g., is standing relatively still. In response, the DRM module 126 permits access to the first and second items of content 312, 314.

At the second stage 304, however, the DRM module 126 determines from data received from the sensor 306 that the user 310 is moving above the threshold amount, e.g., is walking as illustrated. In response, the DRM module 126 restricts access to the second item of content 314 yet permits access to the first item of content 312. In this way, the DRM module 126 may dynamically provide access to individual items of the content 118 in a manner that addresses motion of a user. An example of this access is described in the following and shown in a corresponding figure.

Figure 4:
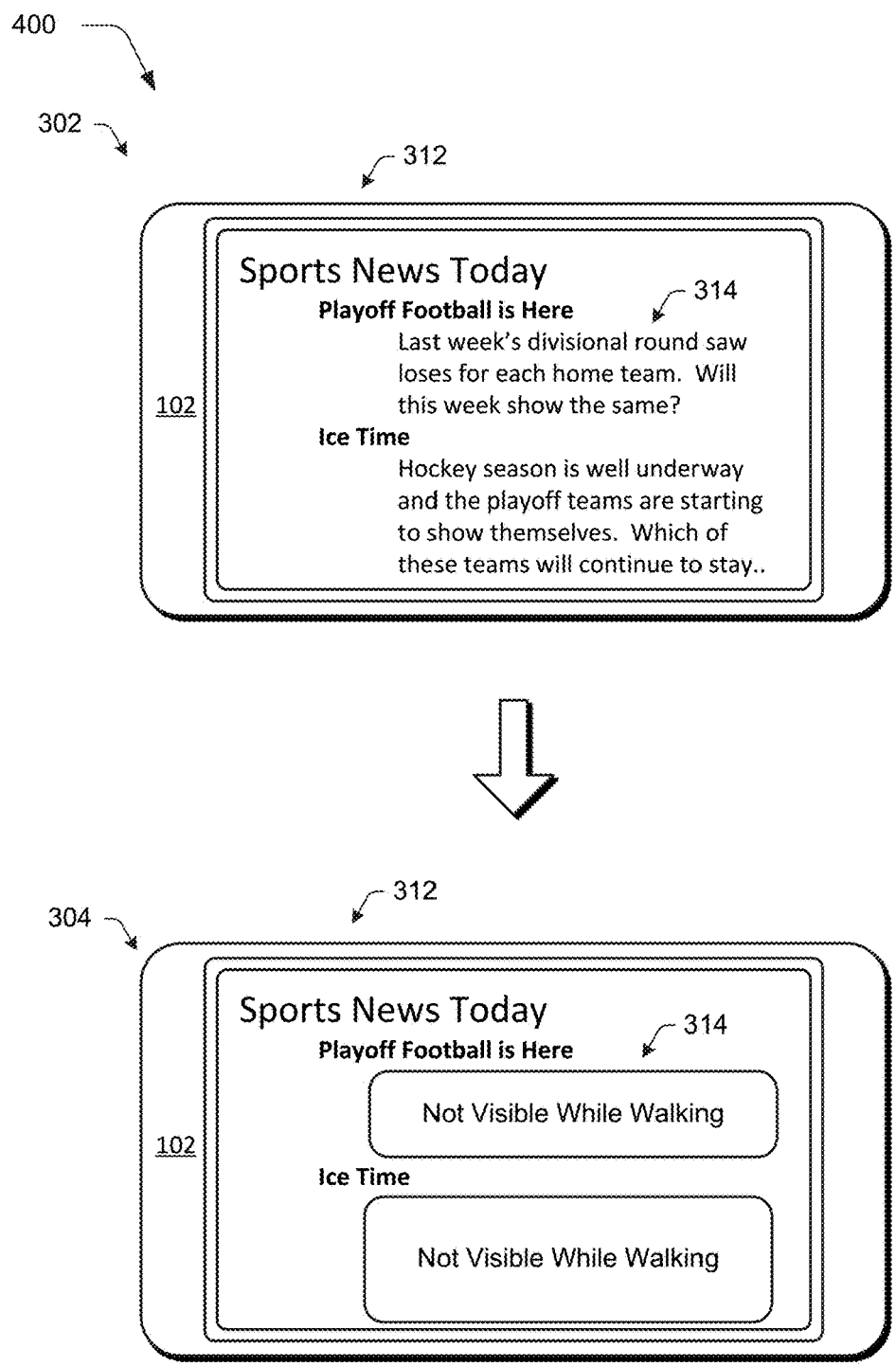
FIG. 4 depicts an implementation showing an example of control of access to items of content based on detected motion.

FIG. 4 depicts an implementation 400 showing an example of control of access to items of content based on detected motion. This implementation is also shown using first and second stages 302, 304 that correspond to the first and second stages 302, 304 of FIG. 3, respectively.

At the first stage 302, the user 310 is not moving above a threshold amount and therefore access to first and second items of content 312, 314 is permitted. The first item of content 312 in this example includes a section header "Sports News Today" and article titles "Playoff Football is Here" and "Ice Time." The second item of content 314 includes a body of the articles. Thus, at the first stage 302 the user 310 may view the section header, article titles, and body of the articles when not moving above a threshold amount. This threshold may be set such that the threshold distinguishes between motion that could find the second item of content 314 distracting (e.g., and therefore potentially harmful to the user 310) and motion at which the second item of content 314 is not a distraction as further described below.

At the second stage 304, for instance, the DRM module 126 determines that the user 310 is moving above the threshold amount, e.g., is walking and not just "fidgeting." In response, the DRM module 126 restricts access to the second item of content 314 (e.g., the body of the articles) but permits access to the first item of content 312, e.g., the section header and article titles. In this way, distraction caused by the second item of content 314 is prevented while moving. This process may continue for a series of successively greater amounts of motion and corresponding greater restrictions on access to respective items of the content, e.g., in a hierarchical relationship based on amounts of motion.

In the illustrated example of the second stage 304, indications are output to inform the user 310 as to why the second item of content 314 is not viewable. Other examples are also contemplated, such as to reformat the content such that these removed sections and the space previously consumed by these sections is not viewable by a user. Additionally, although an ability to view the items of content is described as an example of access, other examples are also contemplated, such as to permit viewing but restrict the user's ability to edit the items of content when moving. In this example, an amount of motion is used to dynamically control access to items of content by the DRM module 126. Other examples are also contemplated in which different types of motion are distinguished, one from another, and used to dynamically control content access, an example of which is described in the following and shown in a corresponding figure.

Figure 5:
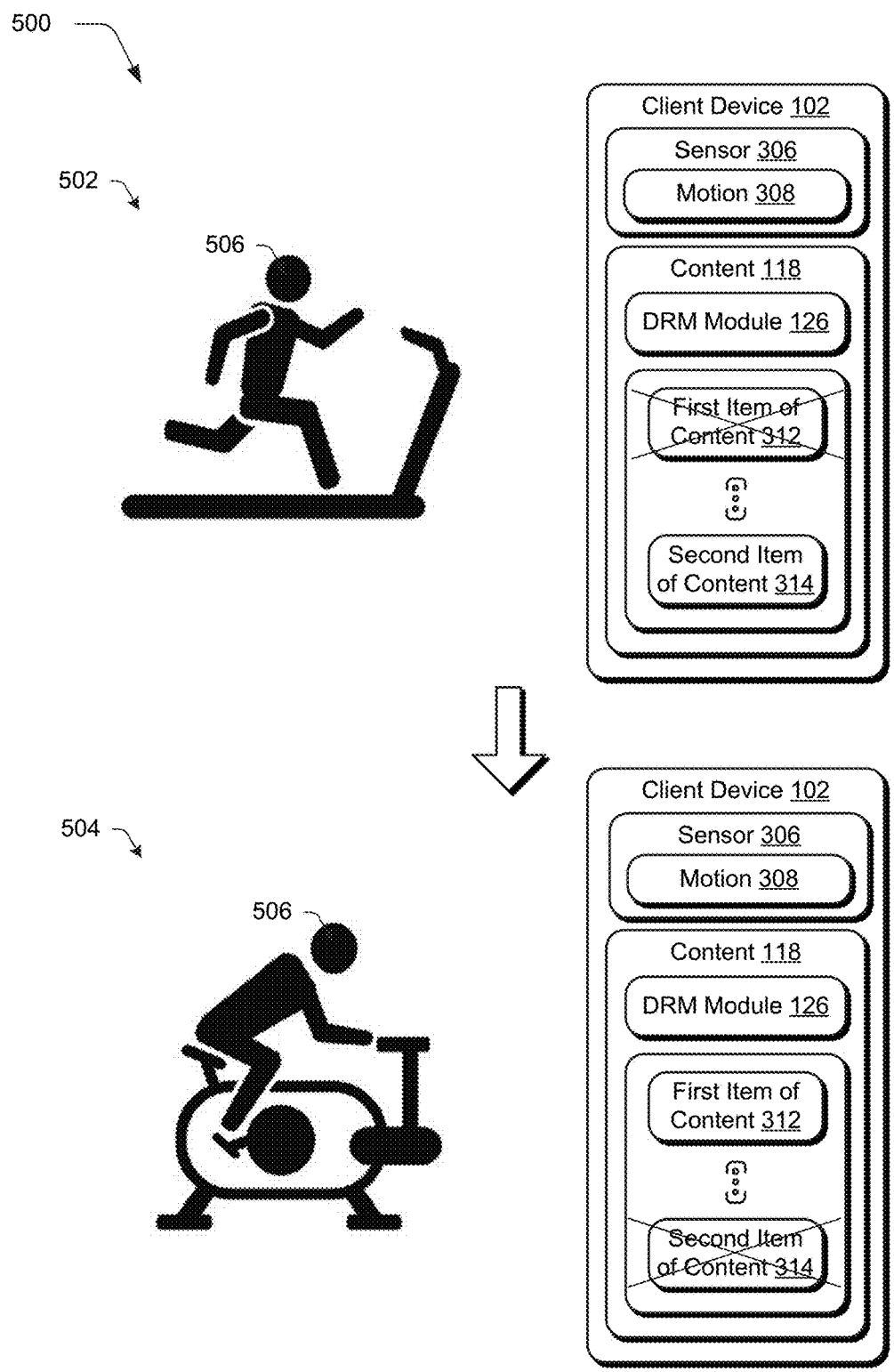
FIG. 5 depicts an implementation showing an example of control of access to items of content based on types of detected motion.

FIG. 5 depicts an implementation 500 showing an example of control of access to items of content based on types of detected motion. This example is illustrated using first and second stages 502, 504. As previously described, the sensor 306 may be configured in a variety of different ways to detect motion 308, such as through use of accelerometers (e.g., three-axis accelerometers), positioning system (e.g., global positioning system receiver), inertia detection device, magnetometers (e.g., detection motion in relation to true north or local objects), and so forth. Through use of one or more of these sensors, motion can be detected as well as a type of motion, which may be used to control access.

As shown at the first stage 502, a user 506 is running. This type of motion is identified by the DRM module 126 by detecting motion of the user's 506 legs (e.g., steps) as well as the swinging of the user's 506 arms. In response, the DRM module 126 restricts access to the first item of content 312 but permits access to a second item of content 314, e.g., that pertains to running.

At the second stage 504, the user 506 is cycling. This type of motion is identified by the DRM module 126 by detecting motion of the user's 506 legs (e.g., steps) and noting that the user's 506 arms are not swinging. In response, the DRM module 126 restricts access to the second item of content 314 but permits access to the first item of content 312, e.g., that pertains to cycling. Thus, the DRM module 126 may differentiate between a variety of different types of motion and dynamically control access to individual items of content. Other traits may also be detected using the sensors 306, additional examples of which are described in the following.

Figure 6:
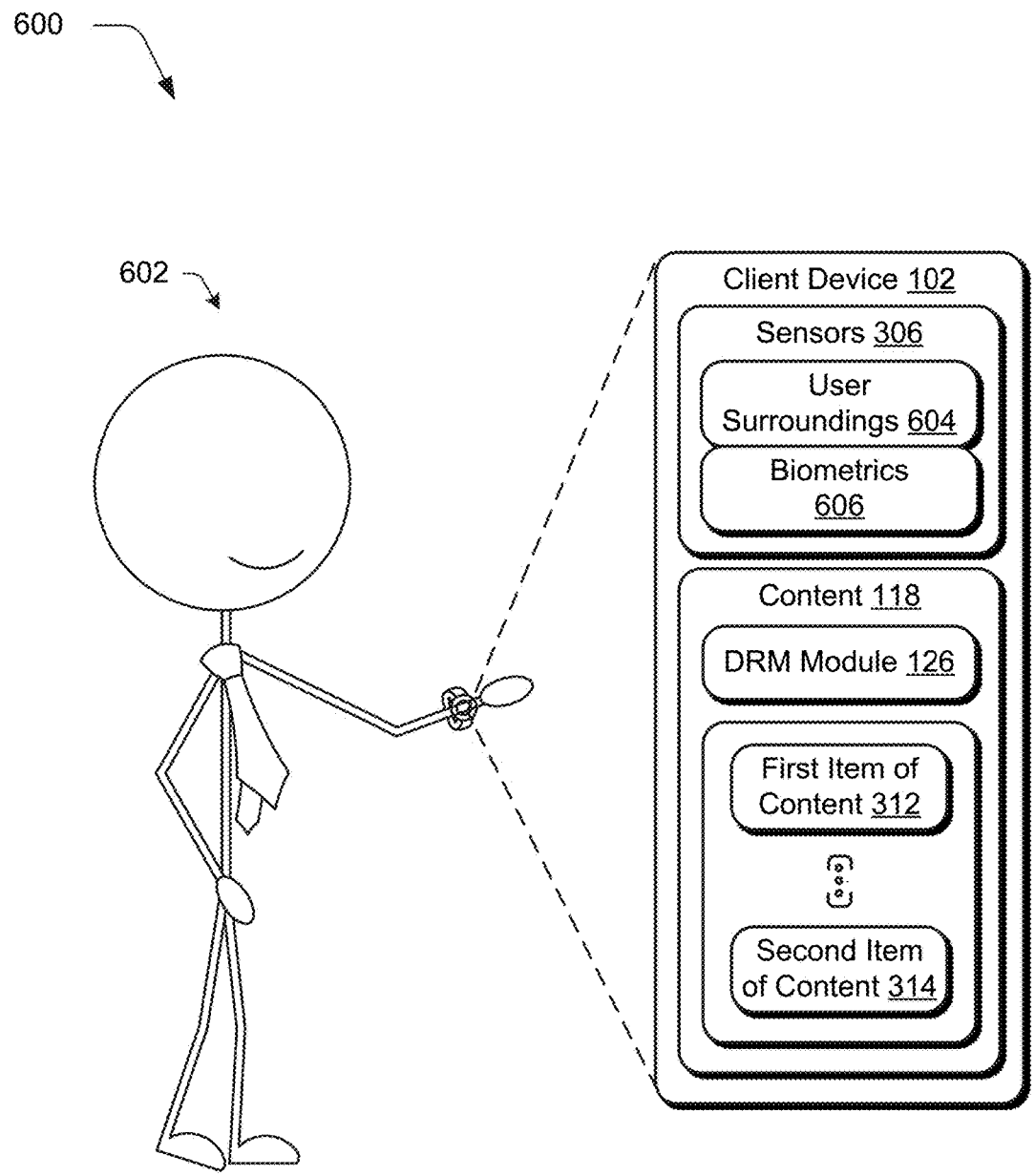
FIG. 6 depicts an example implementation in which sensors are configured to detect environmental traits associated with a request to access content and used as a basis to control content access.

FIG. 6 depicts an example implementation 600 in which sensors 306 are configured to detect environmental traits associated with a request to access content 118 and used as a basis to control content 118 access. The sensors 306 in this example are configured to detect characteristics of an environment in which the content 118 is to be consumed.

In the illustrated instance, the client device 102 is configured as a wearable computer (e.g., a smart watch) that is worn by the user and thus is configured to detect an environment of the user 602 that is to consume the content 118. This includes user surroundings 604 such as temperature, ambient light, and so forth. From this, the DRM module 126 may make a determination as to "where" the content 118 is to be consumed as respond accordingly, further discussion of which is described in relation to FIG. 7.

The sensors 306 may also be configured to detect an environment of the user 602, itself, such as biometrics 606 of the user 602 including heart rate, perspiration, skin temperature, and so forth. Thus, the environment of the user 602 itself may also be leveraged by the DRM module 126 to control consumption of the content 118, further discussion of which is described in relation to FIG. 8.

Figure 7:
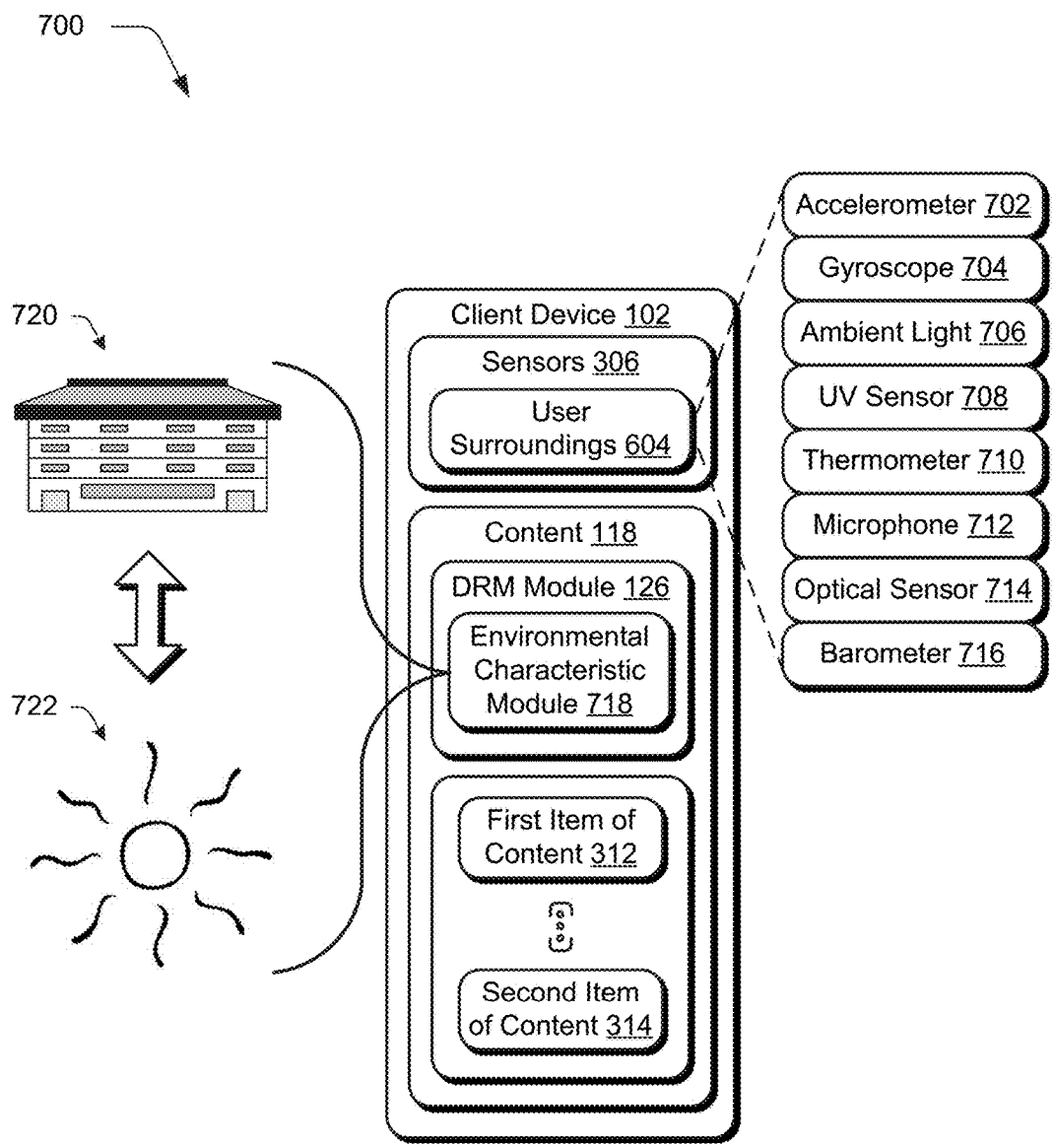
FIG. 7 depicts an example implementation in which an output, from sensors that are configured to detect a user's surroundings, is employed by a DRM module to manage content access.

FIG. 7 depicts an example implementation 700 in which an output from sensors 306 that are configured to detect a user's surroundings 604 is employed by a DRM module 126 to manage content 118 access. A variety of configurations of the sensors 306 may be employed to detect the user surroundings 604, examples of which include an accelerometer 702 (e.g., three-axis accelerometer), gyroscope 704, ambient light 706 sensor, ultraviolet sensor 708, thermometer 710 to detect air temperature, microphone 712, optical sensor 714 (e.g., a camera, infrared sensor), barometer 716, and so forth.

The DRM module 126 in this example implementation 700 includes an environmental characteristic module 718 that processes inputs received from the sensors 306 to infer characteristics about an environment in which the client device 102 and/or a user making a request to access the content 118 is disposed. A simplified example of this is illustrated as a determination as to whether the client device 102 is located indoors 720 or outdoors 722, e.g., from temperature, UV sensor 708, ambient light 706 sensor, and so forth. Other examples are also contemplated, such as to determine a likelihood that a user will be overheard (e.g., via a microphone to detect noises consistent with a coffee shop) or access the items of the content 118 will be otherwise compromised. In this way, the DRM module 126 may dynamically react to traits of a surrounding environment, in which, the content 118 is to be consumed.

Figure 8:
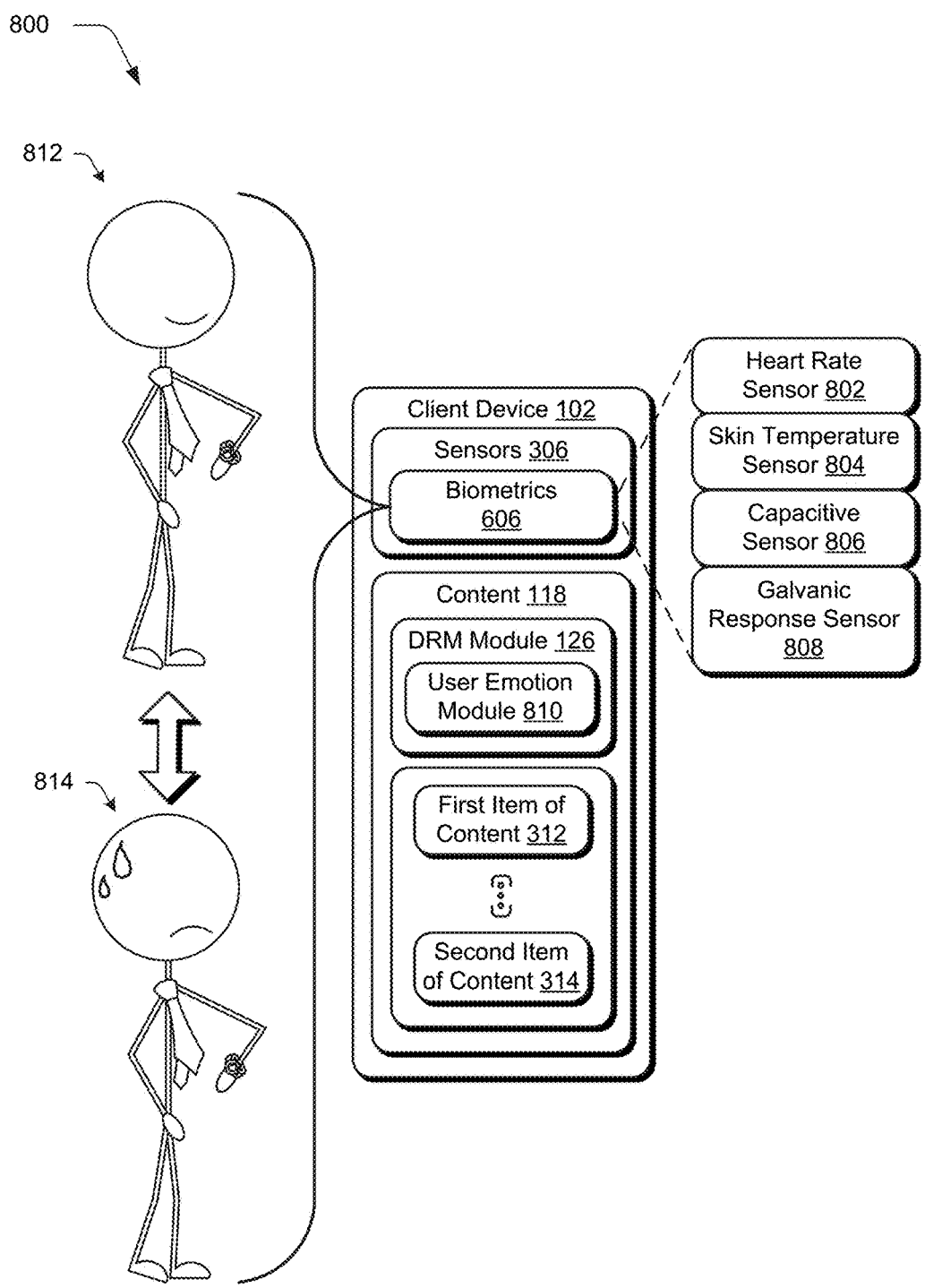
FIG. 8 depicts an example implementation in which an output, from sensors that are configured to detect biometrics of a user, is employed by a DRM module to manage content access.

FIG. 8 depicts an example implementation 800 in which an output, from sensors 306 that are configured to detect biometrics 606 of a user, is employed by the DRM module 126 to manage content 118 access. A variety of configurations of the sensors 306 may be employed to detect biometric 606 information of a user that requests access to the content 118. Illustrated examples of which include a heart rate sensor 802 (e.g., an optical heart rate sensor), a skin temperature sensor 804, a capacitive sensor 806, a galvanic response sensor 808, and so forth.

The DRM module 126 includes a user emotion module 810 that is representative of functionality to infer a likely emotion of a user based on the biometrics 606. Data received form the sensors 306 such as heart rate, skin temperature, and so forth may be used to infer whether the user is happy 812 or agitated 814 in this example. The DRM module 126 may then control access to the first and second items of content 312, 314 based on this inference, such as to prevent access to the second item of content 314 when the user is agitated 814 and permit access when the user has calmed down, e.g., is happy 812. Other inferred emotions are also contemplated such as acceptance, anger, anticipation, disgust, joy, fear, sadness, surprise, courage, hope, and so forth.

Figure 9:
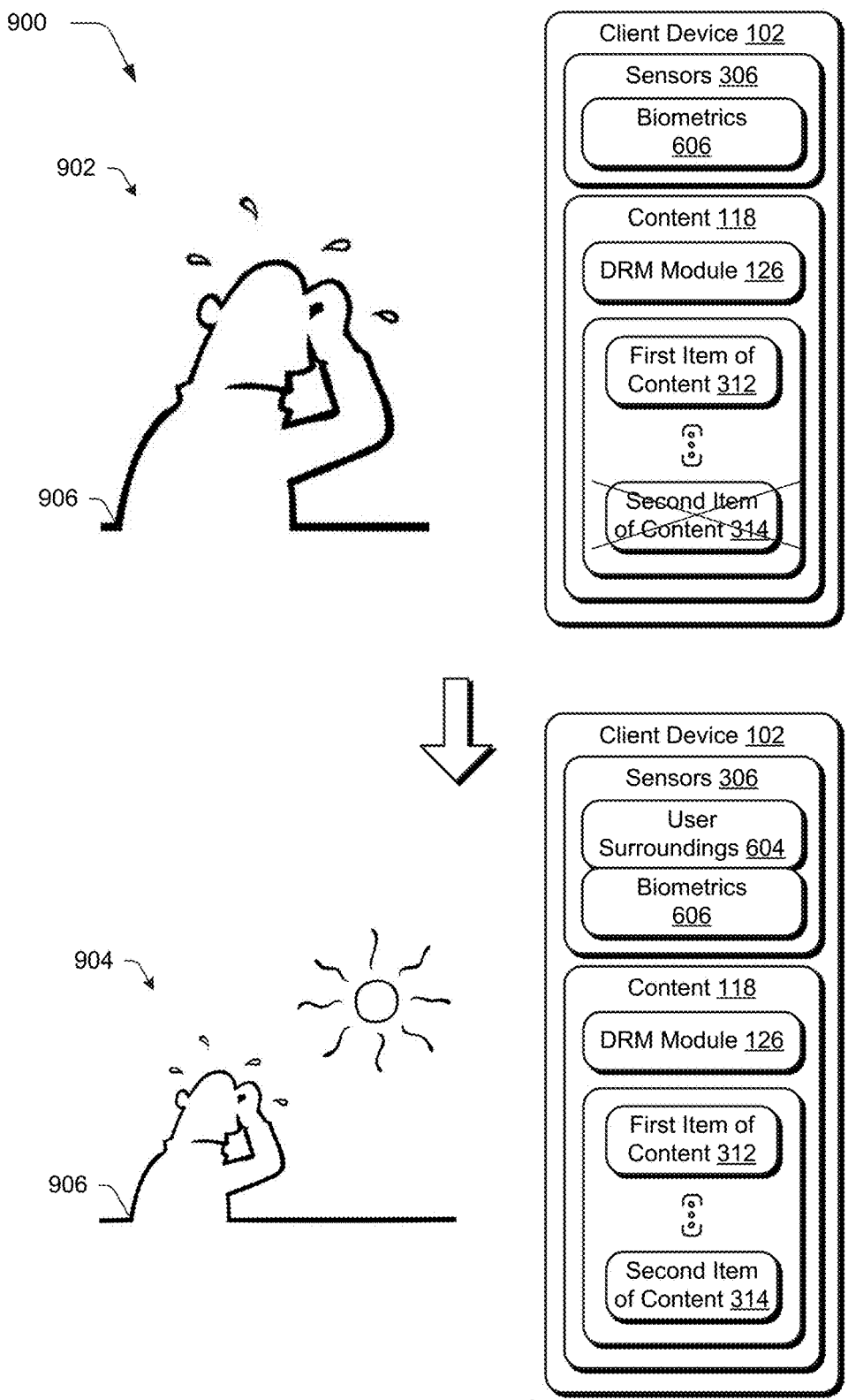
FIG. 9 depicts an example implementation in which detection of a combination of environmental traits including user surroundings and biometrics is used to improve accuracy in a determination in how content 118 is likely to be consumed by a user.

FIG. 9 depicts an example implementation 900 in which detection of a combination of environment traits including user surroundings 604 and biometrics 606 is used to improve accuracy in a determination in how content 118 is likely to be consumed by a user. This implementation 900 is depicted using first and second stages 902, 904. In this example, data from multiple sensors is used to further improve accuracy as to a likely emotion exhibited by a user 906.

At the first stage 902, for instance, data received from the sensors 306 involving biometrics may indicate that the user is likely agitated or worried based on skin temperature and sweating. Accordingly, in such an instance the DRM module 126 may restrict access to the second item of content 314 due to this inference.

At the second stage 904, however, data regarding a user's surroundings 604 is detected by the sensors 306 in addition to the biometrics 606. From this, the DRM module 126 may determine that the user 906 is outside, e.g., due to outside temperature, ambient light, a UV sensor, and so forth. Consequently, the data from the biometrics 606, rather than just indicate an agitated state of emotions of the user 906 may consider a source of the agitation and react accordingly, e.g., to permit access to the second item of content 314 in this example. A variety of other examples are also contemplated, such as to verify user surroundings 604 based on biometrics 606, incorporate motion 308 (e.g., to determine whether the user is likely running inside or outside), and so forth.

Example Procedures

The following discussion describes digital rights management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

Figure 10:
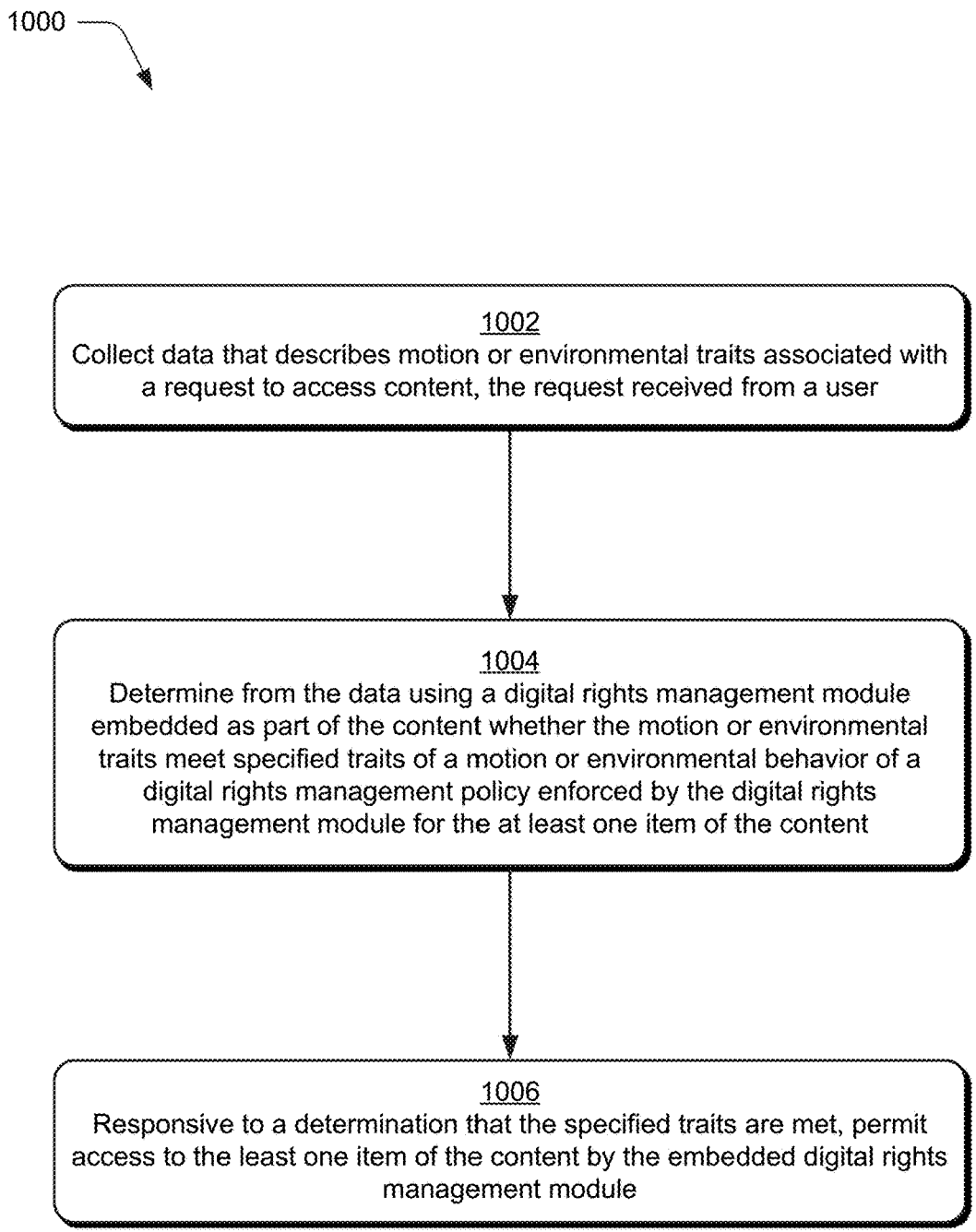
FIG. 10 is a flow diagram depicting a procedure in an example implementation in which motion or environmental traits of a behavior are used to control access to content by a digital rights management module that is embedded as part of the content.

FIG. 10 depicts a procedure 1000 in an example implementation in which digital rights management techniques are used to control access to items of content based on motion or environmental traits. Data is collected that describes motion or environmental traits associated with a request to access content, the request received from a user (block 1002). A variety of motion sensors are contemplated, such as an accelerometer, positioning system, inertia detection device, or magnetometer. Environmental sensors are also contemplated, such as an accelerometer, a gyroscope, an ambient light sensor, an ultraviolet light sensor, a thermometer, a microphone, an optical sensor, or a barometer. Biometric sensors may also be used, such as a heart rate sensor, a skin temperature sensor, a capacitive sensor, or a galvanic skin response sensor.

A determination is made from the data using a digital rights management module embedded as part of the content as to whether the motion or environmental traits meet specified traits of a motion or environmental behavior of a digital rights management policy enforced by the digital rights management module for at least one item of the content (block 1004). The determination, for instance, may be used to determine how a user is likely to consume the content, where the user is likely to consume the content, emotions associated with the user, and so forth.

Responsive to a determination that the specified traits are met, access to the least one item of the content is permitted by the embedded digital rights management module (block 1006). This access, for instance, may be controlled based on a determination of whether a user has completed a particular activity, is engaged in a particular activity, has or does not have a specified emotional state, whether or not the user is moving, and so forth. In this way, the digital rights management module may dynamically react to a user and the user's surroundings to control content access.

Example System and Device

Figure 11:
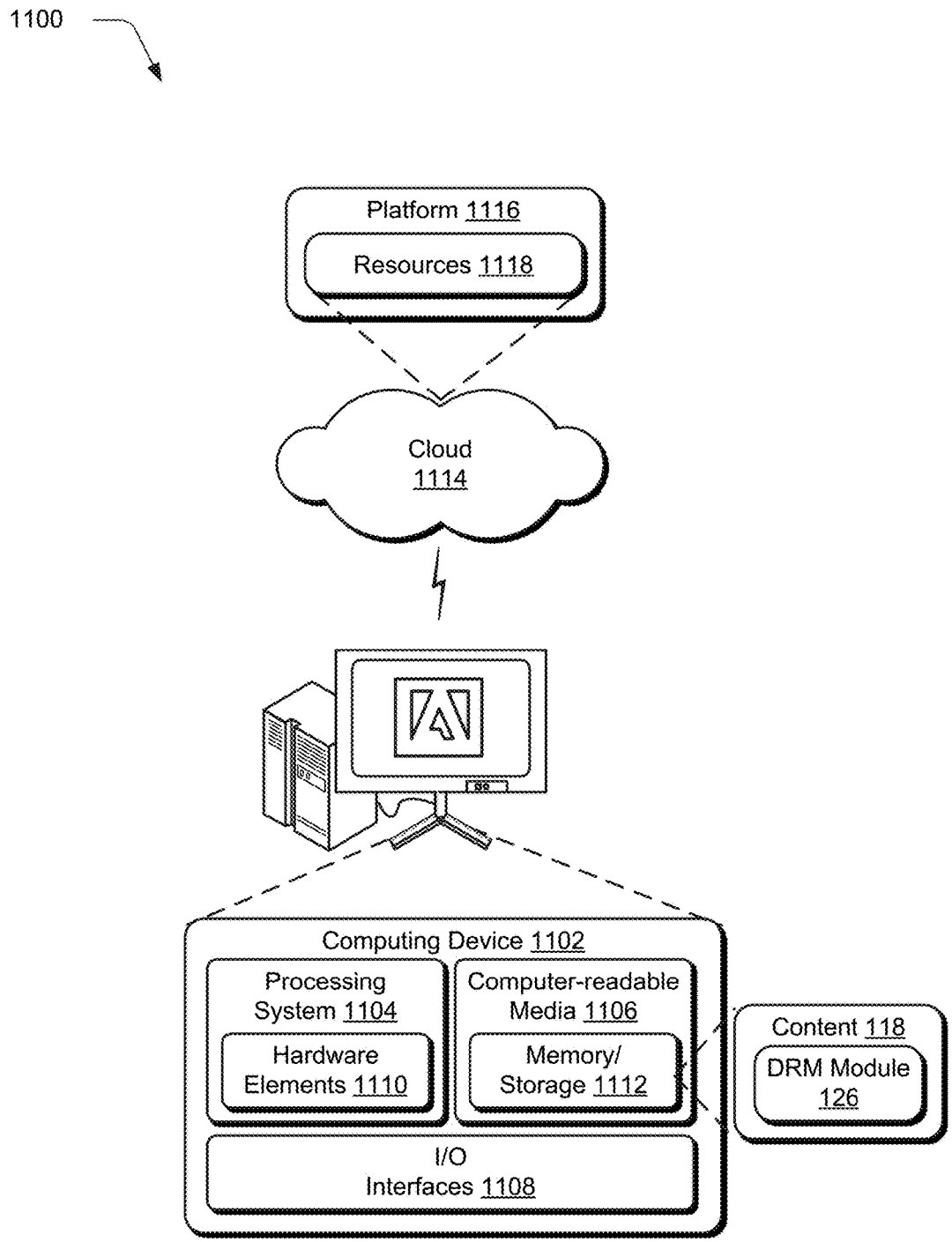
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the content 118 and DRM module 126. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to control access to at least one item of content by digital rights management functionality embedded as part of the content, a method implemented by a client computing device, the method comprising:
   downloading, by the client computing device, the at least one item of content that contains a digital rights management module embedded as part of the content;
   after the downloading, collecting data, by the client computing device, that describes motion traits involving physical motion associated with a user of the client computing device;
   determining from the data using the digital rights management module embedded as part of the content whether the motion traits meet specified traits of a motion behavior of a digital rights management policy enforced by the digital rights management module for the at least one item of the content, the specified traits indicate an amount of motion that is allowed to permit access to the at least one item of the content including a series of successively greater amounts of motion and corresponding greater restrictions on access to the at least one item of the content, the determining from the data including determining whether the at least one item of the content is configured for editing by the user;
   determining, by the embedded digital rights management module through execution by the client computing device, whether access to the at least one item of the content is permitted based on the specified traits and the digital rights management policy; and
   responsive to a determination by the client computing device that access to the at least one item of the content is permitted, displaying the at least one item of content in a user interface by a display device of the client computing device.

2. The method as described in claim 1, wherein the collecting of the data includes receiving the data from one or more sensors.

3. The method as described in claim 2, wherein the one or more motion sensors are configured as an accelerometer, positioning system, inertia detection device, or magnetometer.

4. The method as described in claim 1, wherein the specified traits indicate type of motion to be exhibited by the user.

5. The method as described in claim 1, wherein the determining from the data includes determining whether the at least one item of the content is viewable by the user.

6. The method as described in claim 1, wherein the specified traits include a likelihood that the user is participating in a particular activity.

7. The method as described in claim 1, where in the motion traits include a speed at which the user is moving.

8. The method as described in claim 1, where in the motion traits include a likelihood that the user is physically fit to perform an activity described by the at least one item of content.

9. In a digital medium environment to control access to at least one item of content by digital rights management functionality embedded as part of the content, a method implemented by a client computing device, the method comprising:
   downloading, by the client computing device, the at least one item of content that contains a digital rights management module embedded as part of the content;
   after the downloading, collecting data, by the client computing device, that describes motion or environmental traits associated with a user of the client computing device;
   determining from the data using the digital rights management module embedded as part of the content whether the motion or environmental traits meet specified traits of behavior of a digital rights management policy enforced by the digital rights management module for the at least one item of the content, the specified traits indicate an amount of motion that is allowed to permit access to the at least one item of the content, the determining from the data including determining whether the at least one item of the content is configured for editing by the user;
   determining, by the embedded digital rights management module through execution by the client computing device, whether access to the least one item of the content is permitted based on the specified traits and the digital rights management policy; and
   responsive to a determination by the client computing device that access to the at least one item of the content is permitted, displaying the at least one item of content in a user interface by a display device of the client computing device.

10. The method as described in claim 9, wherein the collecting of the data describing the motion or environmental traits is performed by receiving the data from one or more sensors.

11. The method as described in claim 10, wherein the one or more sensors include an accelerometer, a gyroscope, an ambient light sensor, an ultraviolet light sensor, a thermometer, a microphone, an optical sensor, or a barometer.

12. The method as described in claim 10, wherein the specified traits include a likelihood that the user is participating in a particular activity.

13. The method as described in claim 9, wherein the collecting of the data describing the motion or environmental traits is performed by receiving the data from one or more sensors that describe physical traits associated with the user.

14. The method as described in claim 13, wherein the one or more sensors include a heart rate sensor, a skin temperature sensor, a capacitive sensor, or a galvanic skin response sensor.

15. The method as described in claim 9 the determining whether access to the at least one item of content is permitted is performed responsive to a likelihood that the user exhibits a particular emotion.

16. The method as described in claim 9, wherein the specified traits include traits indicating a likelihood that the user is physically fit to perform an activity described by the at least one item of content.

17. In a digital medium environment to control access to at least one item of content by digital rights management functionality embedded as part of the content, a system comprising:
   one or more sensors that detect motion or environmental traits associated with a user; and
   a digital rights management module implemented at least partially in hardware of a client computing device, the digital rights management module embedded as part of the content and configured to control access to the at least one item of content, the digital rights management module including:

a data collection module implemented at least partially in the hardware of the client computing device and configured to collect data from the one or more sensors; and an access control module implemented at least partially in the hardware of the client computing device and configured to control access to the at least one item of the content based on a determination from the data as to whether the motion or environmental traits meet specified traits of a behavior of a digital rights management policy, the specified traits indicate a series of successively greater amounts of motion and corresponding greater restrictions on access to the at least one item of the content, the determination from the data including determining whether the at least one item of the content is configured for editing by the user.

18. The system as described in claim 17, wherein the motion or environmental traits include a speed, at which, the user is moving or identifying which of a plurality of types of motion are exhibited by the user.

19. The system as described in claim 17, wherein the specified traits include a likelihood that the user is agitated and the permitting of the access is permitted responsive to a determination of a likelihood that the user is not agitated.

20. The system as described in claim 17, wherein the specified traits include a likelihood that the user is participating in a particular activity.

* * * * *